United States Patent [19]
Han

[11] Patent Number: 6,148,699
[45] Date of Patent: Nov. 21, 2000

[54] SCREWDRIVER AND SCREW

[76] Inventor: Ki Su Han, 2249 Lerona Ave., Rowland Heights, Calif. 91748

[21] Appl. No.: 08/918,963

[22] Filed: Aug. 26, 1997

[51] Int. Cl.⁷ .................................................... B25B 23/10
[52] U.S. Cl. ................................ 81/451; 81/456; 81/461; 411/405; 411/407
[58] Field of Search ............................ 81/451, 456, 461; 411/402–405, 407, 410

[56] References Cited

U.S. PATENT DOCUMENTS

| | | | |
|---|---|---|---|
| 3,244,208 | 4/1966 | McKenzie . | |
| 3,707,894 | 1/1973 | Stillwagon, Jr. ........................... | 81/125 |
| 3,739,825 | 6/1973 | Knox . | |
| 3,942,405 | 3/1976 | Wagner ....................................... | 85/46 |
| 4,140,161 | 2/1979 | Russo . | |
| 4,526,072 | 7/1985 | Manhoff, Jr. .............................. | 81/451 |
| 4,647,260 | 3/1987 | O'Hara et al. ........................... | 408/241 |
| 4,736,658 | 4/1988 | Jore .......................................... | 81/451 |
| 4,809,572 | 3/1989 | Sasaki ....................................... | 81/429 |
| 5,207,127 | 5/1993 | Nick .......................................... | 81/54 |
| 5,309,799 | 5/1994 | Jore .......................................... | 81/451 |
| 5,682,800 | 11/1997 | Jore .......................................... | 81/429 |

FOREIGN PATENT DOCUMENTS

1234341  5/1986  Russian Federation ................. 81/451

*Primary Examiner*—D. S. Meislin
*Attorney, Agent, or Firm*—Lee & Hong; Jonathan Y. Kang

[57] ABSTRACT

A screwdriver has a shaft with a bit on one end for engaging a bit receptacle formed on a head of a screw and a screw engaging device coupled to and in surrounding relation to the shaft. The screw engaging device defines a cylindrical void configured to receive and place the head of the screw onto the bit. The inner wall of the screw engaging device defining the cylindrical void has at least one tab extending toward the center of the center of the cylindrical void for engaging the head of the screw. Preferably, there are four tabs disposed evenly space on the inner wall of the screw engaging device. The screw engaging device has a first sleeve defining the cylindrical void and oppositely disposed slots. A second sleeve is coupled to the first sleeve to form the cylindrical void for receiving the shaft therethrough. The shaft has oppositely facing receptacles formed on the outer circumference of the shaft. The screwdriver further has a pair of brackets, each bracket being placed in each one of the oppositely positioned slots and disposed in respective receptacle.

18 Claims, 7 Drawing Sheets

SCREWDRIVER AND SCREW

BACKGROUND OF THE INVENTION

1. Field of the Invention

This invention relates to a screwdriver and screw, and more particularly, to a screwdriver designed for use with a screw having built-in notches or indents around the circumference of the screw head.

2. Description of Related Art

Various types of power or manual screwdrivers have been developed to increase work productivity. They come in various sizes and styles, but with one common shortfall. That is, almost all of them require an operator to manually hold a screw when using the screwdriver. The inconvenience of holding each screw is compounded since the work productivity is directly related to the rate of screws installed into work surfaces.

In addition, conventional screwdrivers are designed to engage a screw only in a bit receptacle formed on the head of the screw. For instance, a Phillips screwdriver is used for a bit receptacle having a cross shape. This may be problematic when the bit receptacle becomes mutilated due to excessive wear and tear. This problem is compounded when a screw is made with softer metal which is more susceptible to mutilation and disformation. In such cases, the screwdriver bit rotates in the bit receptacle of the screw without engaging and transferring the rotating force to the screw. Such action further mutilates the bit receptacle of the screw rendering the screw unusable, and thus, necessitating the mutilated screw to be replaced with a new one.

The mutilation of the head of a screw is also problematic when one needs to unscrew the screw from a work surface. Because the only source for transferring the rotating force from the screwdriver to screw is disfigured, the screw cannot be rotated and must be extracted from the working surface using other forceful means which may destroy the integrity of the work surface.

Certain screwdrivers have various means for holding a screw while screwing the screw into a work material, such as wood. Such screw holding devices do not provide a means for securely holding a screw head against a driving bit to prevent slippage of the bit from the screw head. To use such screwdrivers, a user must apply substantial pressure on the screwdriver handle to force the screw into a work material. Such pressure can result in a penetration of a screw at an undesired offset angle.

SUMMARY OF THE DISCLOSURE

It is an object of the present invention to provide a screwdriver which can be used with a screw with its head having indents to distribute rotational force from the screwdriver handle or a motor to the entire head portion of the screw, and not just the bit receptacle.

It is another object of the present invention to provide a screwdriver which holds the screw having built-in indents in its head so that the screw can be driven into a work material at any desired angles.

According to a first embodiment of the present invention, a screwdriver includes a shaft having a bit on one end for engaging a bit receptacle formed on a head of a screw and a screw engaging device coupled to and in surrounding relation to the shaft. The screw engaging device defines a cylindrical void configured to receive and place the head of the screw onto the bit. An inner wall of the screw engaging device defining the cylindrical void has at least one tab extending toward the center of the center of the cylindrical void for engaging the head of the screw. Preferably, there are four tabs disposed evenly space on the inner wall of the screw engaging device.

The screw engaging device has a first sleeve defining the cylindrical void and oppositely disposed slots. A second sleeve is coupled to the first sleeve to form the cylindrical void for receiving the shaft therethrough. The shaft has oppositely facing receptacles formed on the outer circumference of the shaft. The screwdriver further has a pair of brackets, each bracket being placed in each one of the oppositely positioned slots and disposed in respective receptacle.

The screwdriver is ready to receive the screw when the screw engaging device is rotated in a counter-clock direction with respect to the shaft, and holds the screw when the screw engaging device is rotated in a clockwise direction with respect to the shaft. When the first sleeve abuts against a work surface, the first sleeve rotates counter-clock wise with respect to the shaft thus releasing the screw from the first sleeve.

According to a second embodiment of the present invention, the screw engaging device includes a sleeve defining the cylindrical void, the sleeve having oppositely positioned receptacles for receiving bearings. The shaft has tracks formed on the outer surface of the shaft and oppositely facing each other. Each one of the tracks is configured to receive respective bearing for slidably moving along the shaft.

The screwdriver has a pair of slots formed on each end of each track of the shaft for releasably holding the bearing. By placing the screw engaging device near the bit, the bearings are disposed in the slot formed near the bit and by placing the screw engaging device away from the bit, the bearings are disposed in the slot formed away from the bit.

According to a third embodiment of the present invention, the screw engaging device of the screwdriver includes a main sleeve defining the cylindrical void and having oppositely disposed receptacles configured to receive bearings, an end sleeve coupled to the main sleeve to form the cylindrical void for receiving the shaft therethrough, a cylindrical plug mounted on the shaft near the end opposite to the bit, and a spring disposed between the end sleeve and the cylindrical plug to bias the main sleeve away from the plug. A rear end of the main sleeve has an outer threaded portion for rotatably mounting an end sleeve which has a matching inner threaded portion.

The shaft of the screwdriver further includes, in a substantially outer middle portion, a latitudinal track and a longitudinal track in communication with the latitudinal track to define a traveling path of the bearings installed in the receptacles. There is a first pit on the latitudinal track, and a second pit at the end of the longitudinal track away from the latitudinal track for holding the bearing. Preferably, there are symmetrical latitudinal and longitudinal tracks formed on the opposite outer surface of the shaft. Between the first pit and the latitudinal track, there is a first bump for biasing the bearing to remain in the first pit. Between the second pit and the longitudinal track, there is a second bump for biasing the bearing to remain in the second pit. The first and second bumps are configured and formed so that a sufficient twisting force applied to the main sleeve with respect to the shaft forces the bearings to exit from respective first and second pits.

The above embodiments of the screwdriver is used with a screw adapted for use with a screwdriver having a bit and at least one tab disposed in surrounding relation to the bit. The screw includes a shank having a body portion with a tapered conical section, a head coupled to the shank, and a bit receptacle formed in a substantially center of the head. Around the circumference of the head, there is at least one indent configured to be used with the tab of the screwdriver. Preferably, the head of the screw has four indents equally spaced around the circumference of the head.

These and other aspects, features and advantages of the present invention will be better understood by studying the detailed description in conjunction with the drawings and the accompanying claims.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
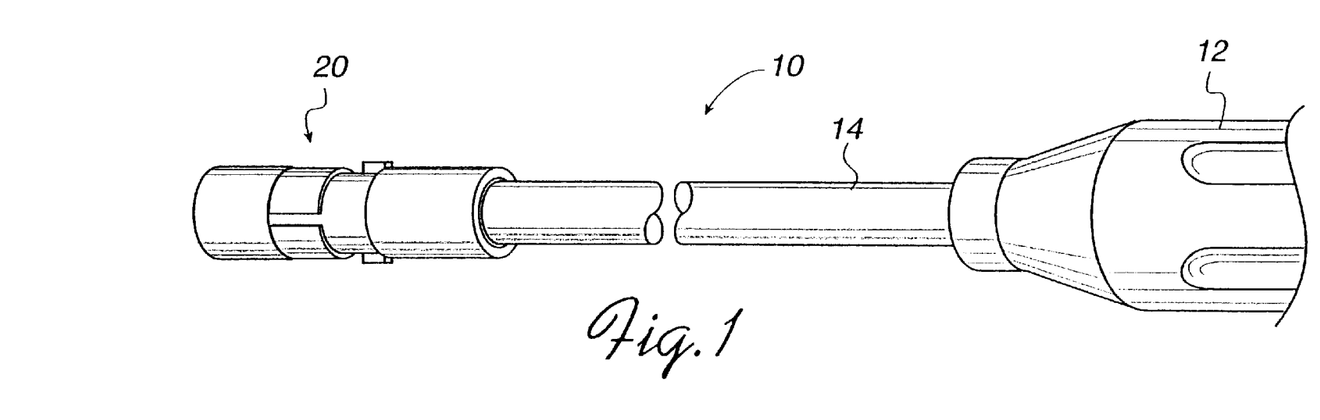
FIG. 1 illustrates a perspective view of a first embodiment of the present invention.
Figure 2:
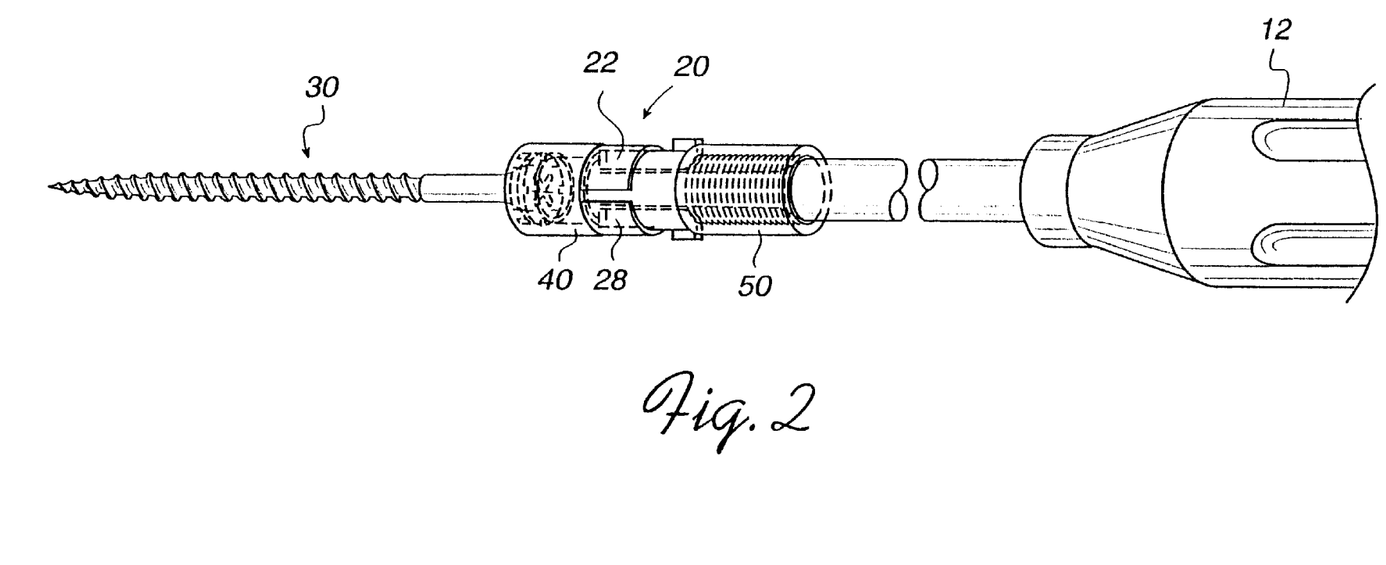
FIG. 2 illustrates an internal structure of FIG. 1.

FIGS. 1–4 illustrate a first embodiment of the present invention. The first embodiment of the screwdriver 10 shown in FIG. 1 includes a handle 12, a shaft 14 in a form of an elongated cylindrical rod securely coupled to the handle 12 at one end and a screw engaging device 20 slidably coupled to the other end of the shaft 14. FIG. 2 illustrates an internal structure of the screw engaging device 20 with a screw 30 having a specially designed head attached to the screw bit. In particular, the first embodiment of the present invention is preferably used with the screw 30 having a head with notches or indents formed around the circumference of the head. The description with regard to the screw 30 is discussed in detail below in connection with FIGS. 11 and 12.

Figures 3, 4:
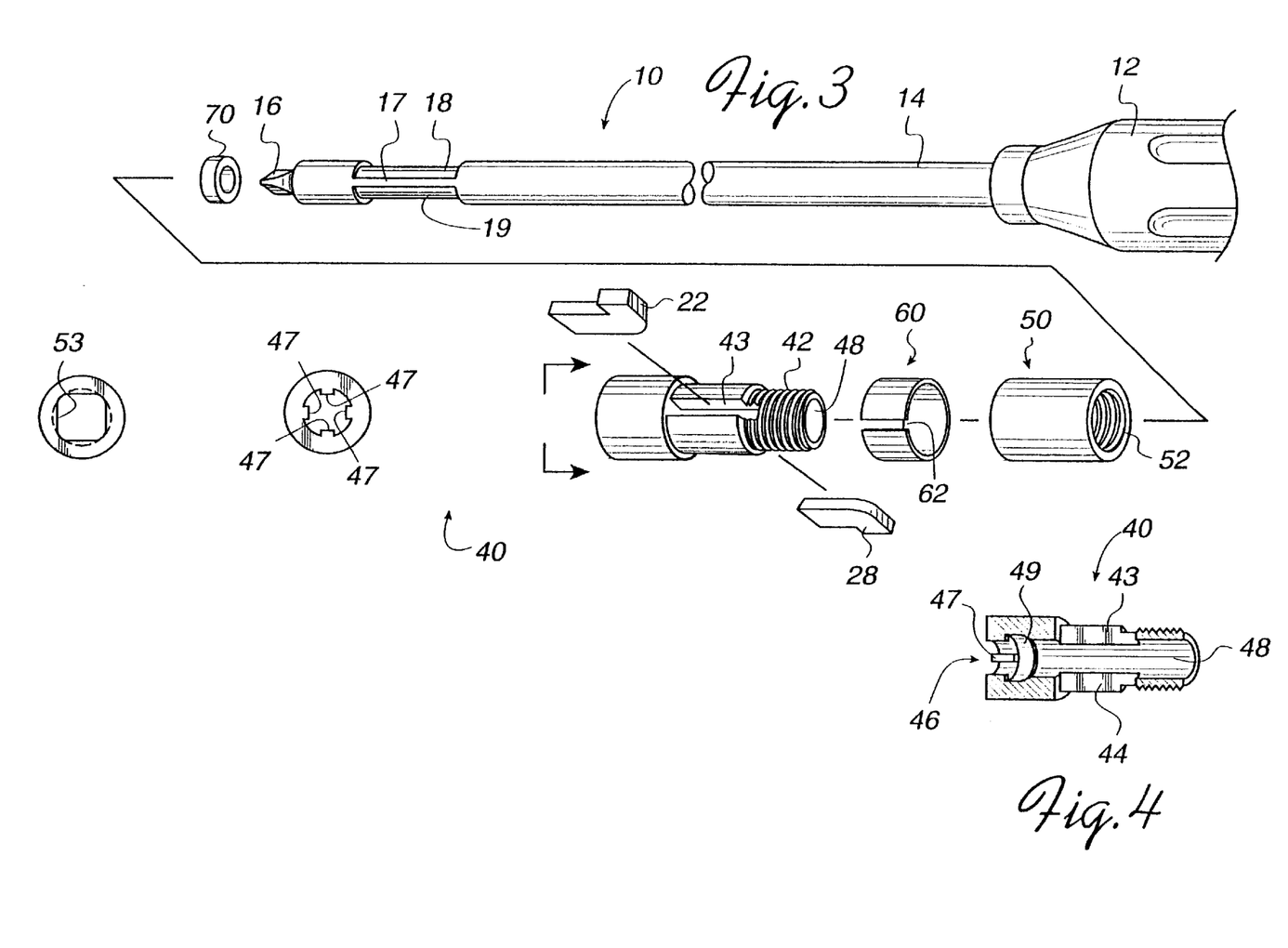
FIG. 3 illustrates an exploded view of the components of the first embodiment of the present invention.
FIG. 4 illustrates a cross sectional view of the main sleeve of the screwdriver of FIG. 1.
Figure 5:
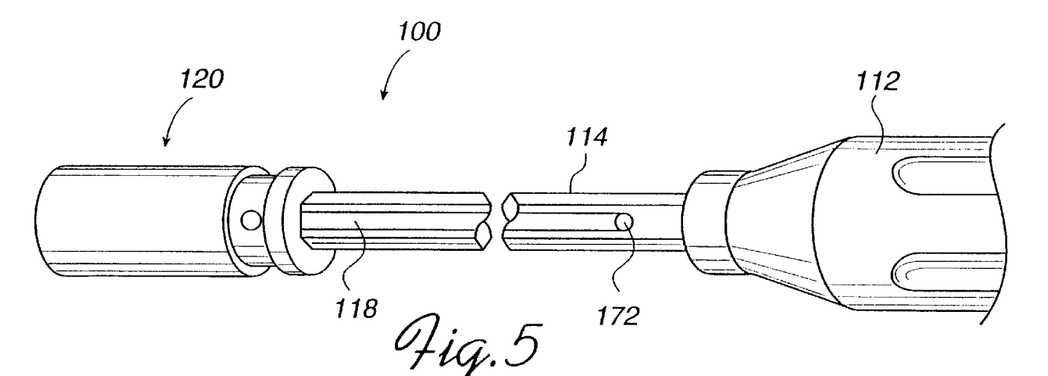
FIG. 5 illustrates a perspective view of a second embodiment of the present invention.

FIG. 3 illustrates an exploded view of the components of the first embodiment of the present invention. The screwdriver 10 illustrated in FIG. 3 includes a shaft 14, one end of which is securely mounted into the handle 12 and the other end forming a driver bit 16. The driver bit 16 and the shaft 14 preferably are formed as one integrated piece and are made with any suitably rigid materials, such as steel. Alternatively, the driver bit 16 may be a replaceable bit which can be inserted into an opening formed on the tip (not shown) of the shaft 14. Hence, a replacement driver bit 16 or a driver bit having a different tip for use with various screws may be inserted into the opening of the shaft 14.

Adjacent to the driver bit 16, there are oppositely disposed receptacles 18 and 19 on the shaft 14. Each receptacle 18 (or 19) is sufficiently long and wide to accommodate an L-shaped bracket 22 (or 28) thereon. The receptacle 18 (or 19) is configured so that the L-shaped bracket 22 (or 28) moves in axial direction as well as laterally therein.

The screw engaging device 20 of the screwdriver 10 of FIG. 3 also includes a main sleeve 40 having a cylindrical body defining an axial opening 48. A rear end of the main sleeve 40 has an outer threaded portion 42 for rotatably mounting a cylindrical end sleeve 50 which has a matching inner threaded portion 52. The main sleeve 40 has, preferably, oppositely facing slots 43 and 44 shaped and configured for placing L-shaped brackets 22 and 28, respectively.

The installation of the screw engaging device 20 on the shaft 14 is as follows. First, the main sleeve 40 and the end sleeve 50 are slidably inserted on the shaft 14 with the end sleeve 50 being inserted first. The end sleeve 50 is rotatably mounted to the main sleeve 40. Two L-shaped brackets 22 and 28 are then inserted into the slots 43 and 44 (shown in FIGS. 2 and 4). A cylindrical brace 60 having an open side or slit 62 is placed onto the outer circumference of the main sleeve 40 to hold the L-shaped brackets 22 and 28 in the slots 43 and 44, respectively. The axial length of the brace 60 is shorter than that of the L-shaped brackets 22 and 28 so that the top portion of the L-shaped bracket is not covered and protrudes out of the body of the main sleeve 40. The slit 62 of the brace 60 allows the brace 60 to expand its diameter for easy installation. The brace 60 is also made of any flexible material to enhance the expanding characteristics. The end sleeve 50 is then screwed onto the threaded portion 42 of the main sleeve 40. The end sleeve 50 may make a contact with an upper portion of the L-shaped bracket 22 or 28. The end sleeve 50 can be adjusted with respect to the main sleeve 40 to allow a screw of various head thicknesses to be installed into an aperture 46 formed by the main sleeve 40.

The internal structure of the main sleeve 40 of the screwdriver 10 is better illustrated in FIG. 4. In a preferred embodiment, around the inner circumference of the aperture 46 of the main sleeve 40, there are a plurality of tabs or extensions 47 protruding toward the center axis of the main sleeve 40. There are preferably four tabs 47 equally spaced and situated in, for example, every 90 degrees, in the aperture 46 for engaging the indents formed on the screw head. The axial opening is sufficiently large to allow the shaft 14 to freely rotate therein. Near the front end of the aperture 46, there is a groove 49 for installing a screw head. For example, when the screw head 13 placed against the driver bit 16, as shown in FIG. 2, the screw head 13 is disposed in the groove 49. The purpose of the groove 49 is to allow the screw head to rotate therein so that the tabs 47 of the main sleeve 40 is offseted with the indents of the screw head for securely holding the screw against the driver bit 16. In surrounding relation to the drive bit 16, there may be a cylindrical washer 70 having, preferably, a magnetic characteristic for holding a screw against the driver bit 16.

Alternative to having an aperture with extending tabs 47, the aperture may be configured to receive a square head screw (illustrated in FIG. 13) by having a substantially square aperture 53, as illustrated in FIG. 4.

The operation of the screwdriver 10 according to the first embodiment is discussed below in reference to FIG. 2. After a desired depth adjustment has been made by adjusting the end sleeve 50 with respect to the main sleeve 40, the screw engaging device 10 is rotated about its axis to a counterclock position with respect to the shaft 14 for installing a screw 30. The amount of rotation of the screw engaging device 10 is restricted by the position of oppositely positioned spines 17 (only one is shown in FIG. 3) which partitions two receptacles 18 and 19. Since the L-shaped bracket 22 rests on the surface defined by the receptacle 18, the lateral rotation of the main sleeve 40 with respect to the shaft 14 is restricted when the L-shaped bracket 22 makes a contact with the spine 17.

The head of a screw 30 is then applied against the driver bit 16 by inserting into the aperture 46 defined by the main sleeve 40. The head of the screw 30 has a unique construction in that the head has indents (shown as reference numerical 306 in FIG. 11) which are equally spaced to match the spacing of the tabs 47. Each indent 306 of the screw head is slightly larger than the tab 47 for easy sliding of the screw head into the aperture 46. The screw head then abuts against the magnetized washer 70 which hold the screw 30 securely in the screw engaging device 10. When the screw engaging device 10 rotates to a clock position with respect to the shaft 14, the tabs 47 rotate with respect to the screw head, thus sandwiching the screw head between the tabs 47 and the magnetized washer 70. As a result, the securely held screw 30 is ready to be mounted into any work surface.

When the screw 30 is almost embedded in the work surface and the front end of the main sleeve 40 makes a contact with the work surface, the main sleeve 40 stops rotating because it abuts against the work surface. The continued rotation of the screwdriver 10 rotates the shaft 14 which is rotatably inserted into the main sleeve 40. As a result, each indent of the screw head once again aligns with respective tabs 47, allowing the screw 30 to exit the main sleeve 40 while the main sleeve 40 is gradually pulled backwards.

As an alternative, the end sleeve 50 may be adjusted with respect to the main sleeve 40 so that the screw head is no longer placed in the groove 49. This allows the tabs 47 to engage the indents of the screw head while the driver bit 16 engages the screw receptacle. When the screw 30 is almost embedded into the work surface, the front end of the main sleeve 40 begins to make a contact with the work surface. The force of the work surface against the main sleeve 40 pushes the main sleeve 40 toward to handle 12 of the screwdriver 10, which in the process exposes the driver bit 16. As the screwdriver is further rotated, the screw head slowly travels along the length of the tabs 47 until the screw head full emerges out of the main sleeve 40.

When the main sleeve 40 is pushed toward the handle 12, the L-shaped brackets 22 and 28 moves out of the respective receptacles 18 and 19 and onto the shaft 14. When the L-shaped brackets 22 and 28 are no longer in the receptacles 18 and 19, the driver bit 16 is fully exposed. During normal operation, the expandable brace 60 biases the L-shaped brackets 22 and 28 to remain in the respective receptacles 18 and 19.

The screwdriver 10 according to the first embodiment may be used as a conventional screwdriver by moving the screw engaging device 20 toward the handle 12 thus exposing the driver bit 16. This option may be used for mounting and removing (i.e., unscrewing) conventional screws not having the indents or motions on their head.

Figure 6:
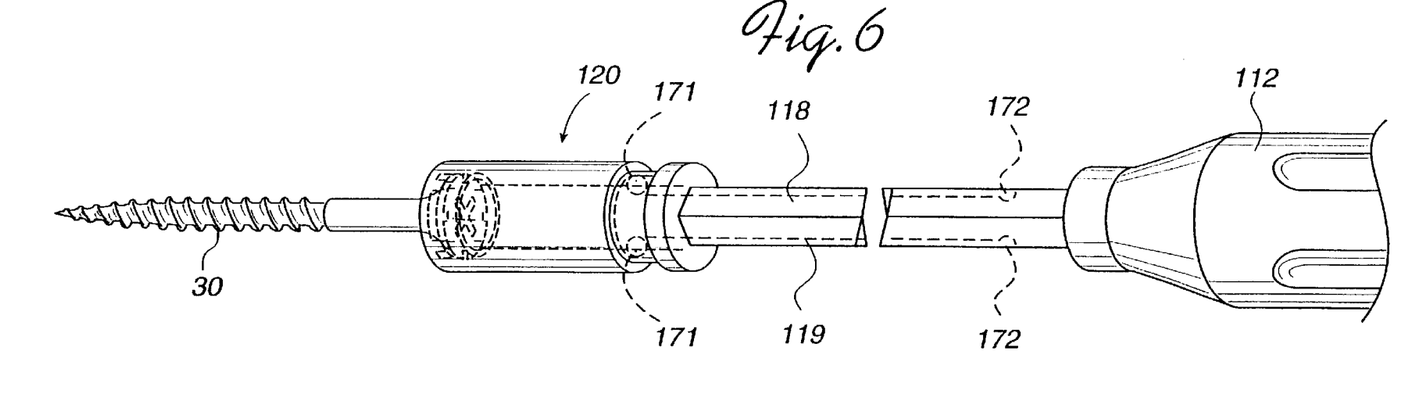
FIG. 6 illustrates an internal structure of FIG. 5.

FIGS. 5–8 illustrate a second embodiment of the present invention. The second embodiment of the screwdriver 110 shown in FIG. 5 includes a handle 112, a shaft 114 securely coupled to the handle 112 and a screw engaging device 120 slidable coupled to the shaft 14. FIG. 6 illustrates an internal structure of the screw engaging device 120 in phantom lines with a screw 30 having a specially designed head attached to the driver bit 116. In particular, the second embodiment of the present invention is preferably used with the screw 30 having a head with notches or indents formed around the circumference of the head.

Figures 7, 8:
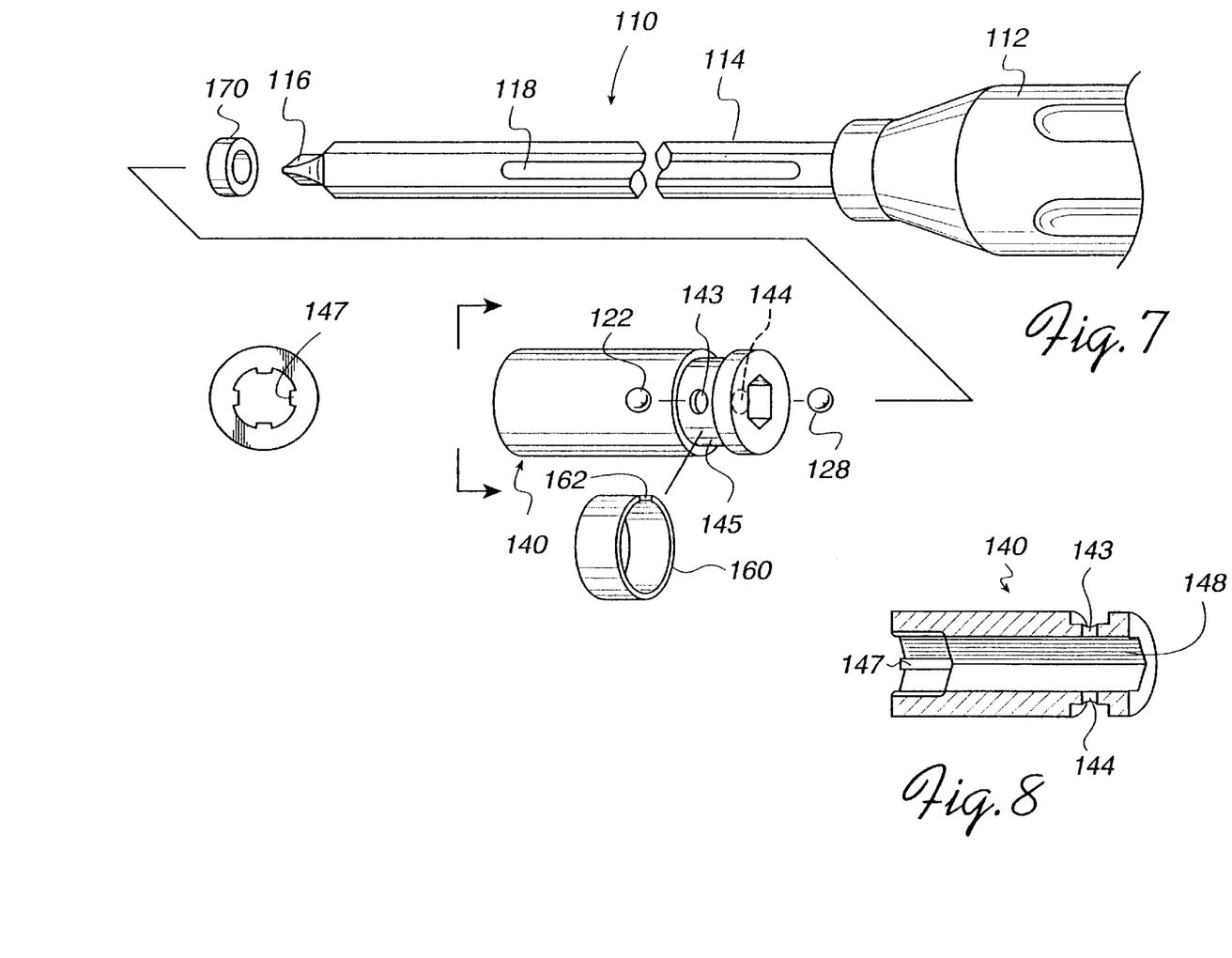
FIG. 7 illustrates an exploded view of the components of the second embodiment of the present invention.
FIG. 8 illustrates a cross sectional view of the main sleeve of the screwdriver of FIG. 5.

FIG. 7 illustrates an exploded view of the components comprising the second embodiment of the present invention. The screwdriver 110 illustrated in FIG. 7 includes a shaft 114, one end of which is securely mounted into the handle 112 and the other end forming a driver bit 116. The driver bit 116 and the shaft 114 preferably are formed as one integrated piece and made with any suitable materials, such as steel. Alternatively, the driver bit 116 may be a replaceable bit which can be inserted into an opening formed on the tip (not shown) of the shaft 114. Hence, a replacement driver bit 116 or a driver bit having a different tip for use with various types of screws may be inserted into the opening of the shaft 114.

Near the driver bit 116, there are oppositely disposed elongated grooves 118 and 119 (see FIG. 6) on the shaft 114. The grooves 118 and 119 are configured to slidably accommodate a pair of bearings 122 and 128 thereon, respectively.

The screw engaging device 120 of the screwdriver 110 of FIG. 7 also includes a main sleeve 140 having a cylindrical body defining an axial opening 148. Near the rear end of the main sleeve 140, there is a neck portion 145. The rear end of the main sleeve 140 defines an opening for inserting the shaft 114. In the neck portion 144 of the main sleeve 40, there are preferably two oppositely disposed receptacles 143 and 144 shaped and configured for placing the bearings 122 and 128 therein.

The installation of the screw engaging device 120 on the shaft 114 is as follows. First, the main sleeve 140 is slidably inserted onto the shaft 114. Two ball bearings 122 and 128 are then inserted into the receptacles 143 and 144 (shown in FIG. 8). A cylindrical brace 160 having an open side or slit 162 is placed onto the outer circumference of the main sleeve 140 to hold the bearings 122 and 128 in the receptacles 143 and 144, respectively. The open side or slit 162 of the brace 160 allows the brace 160 to expand about its center for easy installation.

The main sleeve 140 is position with respect to the shaft 114 so that the bearings 122 and 128 are situated in a pair of oppositely positioned grooves 118 and 119. As better illustrated in FIG. 6, each groove 118 (or 119) forms a track along the longitudinal length of the shaft 114. The grooves 118 and 119 are preferably symmetrical with respect to each other. At each end of the groove 118, there are slots 171 and 172 configured to receive a bearing. Each slot 171 or 172 is trenched into the shaft with a depth slightly greater than the depth of the groove 118 to allow the bearing 122 or 128 to snugly fit therein. When the main sleeve 140, which moves axially with respect to the shaft 114, is positioned near the driver bit 116 of the screwdriver 110, the bearings 122 and 128 are placed into the oppositely disposed pits 171. This allows the screwdriver 110 to be used with the screw engaging device 120. Alternatively, by positioning the main sleeve 140 near the handle 112, the bearing 122 and 128 are placed into the oppositely disposed slots 172, thus away from the driver bit 116. This way, the screwdriver 110 may be used as a normal screwdriver for using conventional screws not having indents formed in the head. The exposed driver bit 116 may also be used for removing (i.e., unscrewing) embedded screws.

The cross section view of the main sleeve 140 of the screwdriver 110 is illustrated in FIG. 8. Around the inner circumference of the front end of the aperture 146 of the main sleeve 140, there are a plurality of tabs or extensions 147 protruding toward the center axis of the main sleeve 140. In the preferred embodiment, there are four tabs 147 equally spaced and situated in, for example in every 90 degrees, in the aperture 146. The cross-section of the rear end of the axial opening 148 preferably has a hexagonal shape to match the cross sectional shape of the shaft 114. As a result, the shaft 114 and the screw engaging device 120 rotates as one piece without slipping. Alternatively, the cross-section of the axial opening 148 and the shaft 114 may be of any suitable geometric shape. The aperture 46 is sufficiently large for installing therein a cylindrical washer 170 having, preferably, a magnetic characteristic for holding a screw against the driver bit 116. The washer 170 is disposed around the driver bit 116.

The operation of the screwdriver 110 according to the second embodiment is discussed below in reference to FIG. 6. To use the screwdriver 110 with the screw engaging device 120, the main sleeve 140 is positioned toward the front end until the bearings 122 and 128 are placed in the oppositely positioned pits 171.

The head of a screw 30 is then applied against the driver bit 116 by inserting into the aperture 146 defined by the main sleeve 140. The head of the screw 30 has a unique construction in that the head has indents (shown as reference numerical 306 in FIG. 11) which are equally spaced to match the spacing of the tabs 147. Each indent of the screw head is slightly larger than the tab 147 for easy sliding of the screw head into the aperture 146. The screw head then abuts against the magnetized washer 70 which holds the screw 30 securely in the screw engaging device 120. The securely held screw 30 is ready to be mounted into any work surface.

When the screw 30 is almost embedded into the work surface, the front end of the main sleeve 140 begins to make a contact with the work surface. The force of the work surface against the main sleeve 140 pushes the bearings 122 and 128 out of the pits 171. As a result, the main sleeve 140 moves toward to handle 112 of the screwdriver 110, which in the process exposes the driver bit 116. As the screwdriver is further rotated, the screw head slowly travels along the length of the tabs 147 until the screw head full emerges out of the main sleeve 140.

Figure 9:
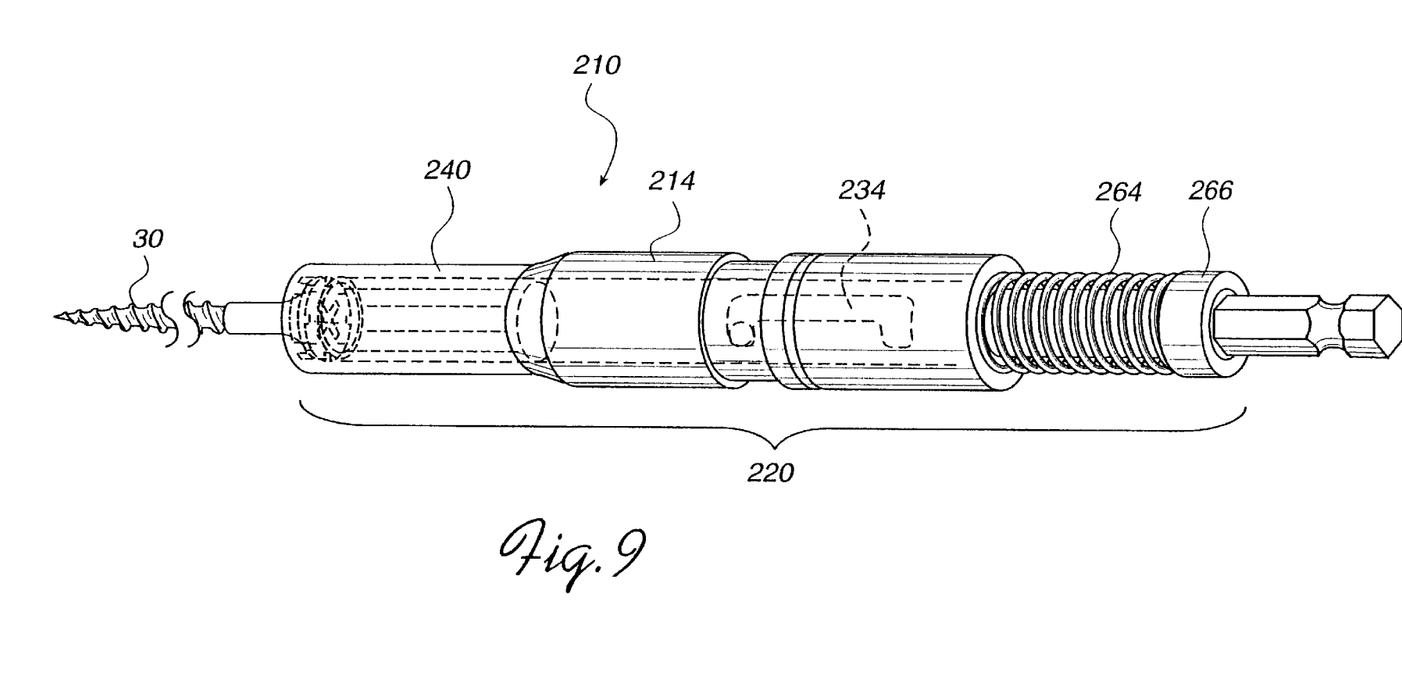
FIG. 9 illustrates a perspective view of a third embodiment of the present invention.
Figure 10:
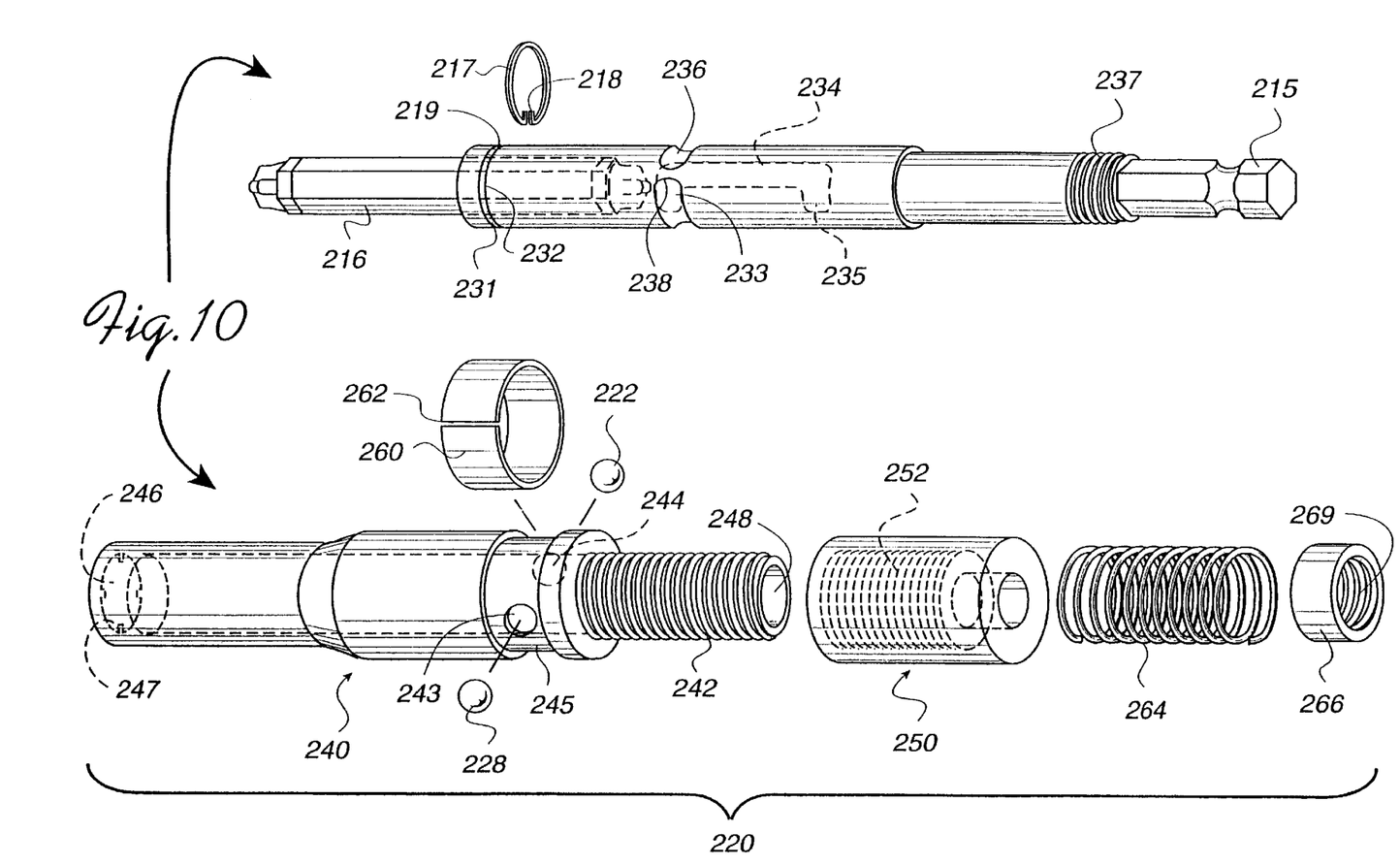
FIG. 10 illustrates an exploded view of the components of the third embodiment of the present invention.

FIGS. 9 and 10 illustrate a third embodiment of the present invention for use preferably with a motor driven power tool. The third embodiment of the screwdriver 210 shown in FIG. 9 includes a spindle or shaft 214 and a screw engaging device 220 rotatably mounted to the spindle 214. Similar to the embodiments described above, the third embodiment of the present invention is preferably used with a screw 30 having a head with indents formed around the circumference of the head.

FIG. 10 illustrates an exploded view of the components making up the third embodiment of the present invention. The screwdriver 210 illustrated in FIG. 10 includes a spindle 214, the rear end 215 having a hexagonal cross-section for installing in a motorized power tool and the front end forming a driver bit 216. The driver bit 216 may be inserted into an axial opening defined by the spindle 214 formed on the front portion of the spindle 214. As a result, a replacement driver bit 216 or a driver bit having a differently configured tip for using various types of screws may be inserted into the opening.

Near the front end of the spindle 214, there is a neck portion 231 which has a smaller outer diameter than that of the adjacent region of the spindle 210 and is configured to receive the bit coupler 217 having an extension 218 formed toward the center of the bit coupler 217. Once the bit coupler 217 is mounted onto the neck portion 231, the extension 218 protrudes through an opening 219 formed on the neck portion 231, as shown in FIG. 10. As a result, the extension 218 protrudes out of the interior wall of the cylindrical opening, thus engaging a receptor groove 232 which is formed substantially around the driver bit 216. Because the bit coupler 217 is made of a flexible material, the driver bit 216 may be released from the cylindrical opening by simply pulling on the driver bit 216 away from the spindle 214.

In the middle portion of the spindle 214 and around the outer circumference, there is a latitudinal track 236 and a longitudinal track 234 in communication with the latitudinal track 236. Both tracks define the traveling path of bearings 222 and 228. On the latitudinal track 236, there is a first pit 233. In addition, at the end of the longitudinal track 234, there is a second pit 235 for holding the bearing 222. Although not shown in FIG. 10, the tracks symmetrical to the latitudinal track 236, longitudinal track 234, first pit 233 and second pit 235 are also formed on the opposite outer surface of the spindle 214. Between the first pit 233 and the latitudinal track 236, there is a bump 238 for biasing the bearing to remain in the first pit 233. The same is also true for the second pit 235 and the longitudinal track 234. However, the height of the bump 238 is such that a sufficient twisting force applied to the spindle 214 will force the bearing 222 to exit from respective pits and onto the tracks.

The screw engaging device 220 of the screwdriver 210 of FIG. 10 also includes a main sleeve 240 having a cylindrical body and an axial opening 248 for receiving the spindle 214. A rear end of the main sleeve 40 has an outer threaded portion 242 for rotatably mounting an end sleeve 250 which has a matching inner threaded portion 252. The main sleeve 240 has, preferably, oppositely disposed receptacles 243 and 244 shaped and configured for installing bearings 222 and 228, respectively.

The installation of the screw engaging device 220 onto the spindle 214 is as follows. First, the main sleeve 240 is slidably inserted onto the spindle 214. The end sleeve 250 is inserted from the rear end of the spindle 214 and mates with the main sleeve 240. The end sleeve 250 is rotatably mounted by screwing the matching inner threaded portion 252 onto the main sleeve 240. The position of the end sleeve 250 with respect to the main sleeve 240 may be adjusted for proper fitting of the head of a screw into the main sleeve 240.

A spring 264 is placed immediately behind the end sleeve 250. The spring 264 is disposed between the end sleeve 250 and the cylindrical plug 266. The plug 266 has an inner thread 267 which matches an end thread 237 formed on the outer circumference of the spindle 214.

Two bearings 222 and 228 are inserted into the receptacles 243 and 244, respectively. A cylindrical brace 260 having a slit 262 is placed onto the neck portion 245 of the main sleeve 240 to hold the bearings 222 and 228 in the receptacles 243 and 244, respectively. The slit 262 of the brace 260 allows the brace 260 to axially expand for easy installation. The main sleeve 240 of the screw engaging device 220 is position with respect to the spindle 214 so that the bearings 222 and 228 are situated in a pair of oppositely positioned tracks 236 (only one track is illustrated in FIG. 10).

The internal structure of the main sleeve 240 of the screwdriver 210 is similar to that of the first embodiment illustrated in FIG. 4, and thus will not be repeated here.

The operation of the screwdriver 210 according to the third embodiment is discussed below in reference to FIG. 9. After a desired adjustment has been made by adjusting the end sleeve 250 with respect to the main sleeve 240, the head of a screw 30 is applied against the driver bit 216 by inserting into the aperture 246 formed by the main sleeve 240. The head of the screw 30 has a unique construction in that the head has indents which are equally spaced to match the spacing of the tabs 247.

The screw engaging device 210 is then turned about its axis to a counter-clock position with respect to the spindle 24. At this position, the bearings 222 and 228 are placed in the oppositely positioned first pit 233 (only one is shown in FIG. 10). Once the screw head is fully inserted into the aperture 246 and abuts against the driver bit 216, the main sleeve 240 is rotated with respect to the spindle 214 to offset the indents of the screw head with the tabs 247 of the main sleeve 240. As a result, the securely held screw 30 is ready to be mounted into any work surface.

When the screw 30 is almost embedded in the work surface and the front end of the main sleeve 240 makes a contact with the work surface, the main sleeve 240 stops rotating because it abuts against the work surface while the spindle 214 continues to rotate about its axis. The continued rotation of the spindle 214 moves the bearings 222 and 228 from their respective first pits 233 until the bearings 222 and 228 are positioned on the longitudinal tracks 234. During this process, the indents of the screw head realigns with the tabs 247 and thus freely exits the main sleeve 240 as the spindle 214 continues to rotate, while the main sleeve 40 gradually pulls backwards.

As an alternative to using the above embodiment, the screwdriver 210 according to the third embodiment may also be used as a conventional screwdriver by relocating the screw engaging device 220 toward the handle 12 by pulling the main sleeve 240 with respect to the spindle 214 through the longitudinal track 234 and by positioning the bearings 222 and 228 into the oppositely disposed second pits 235, thus exposing the driver bit 216. This configuration may be used for mounting and removing (i.e., unscrewing) conventional screws not having the indents formed on their head.

Figures 11, 13:
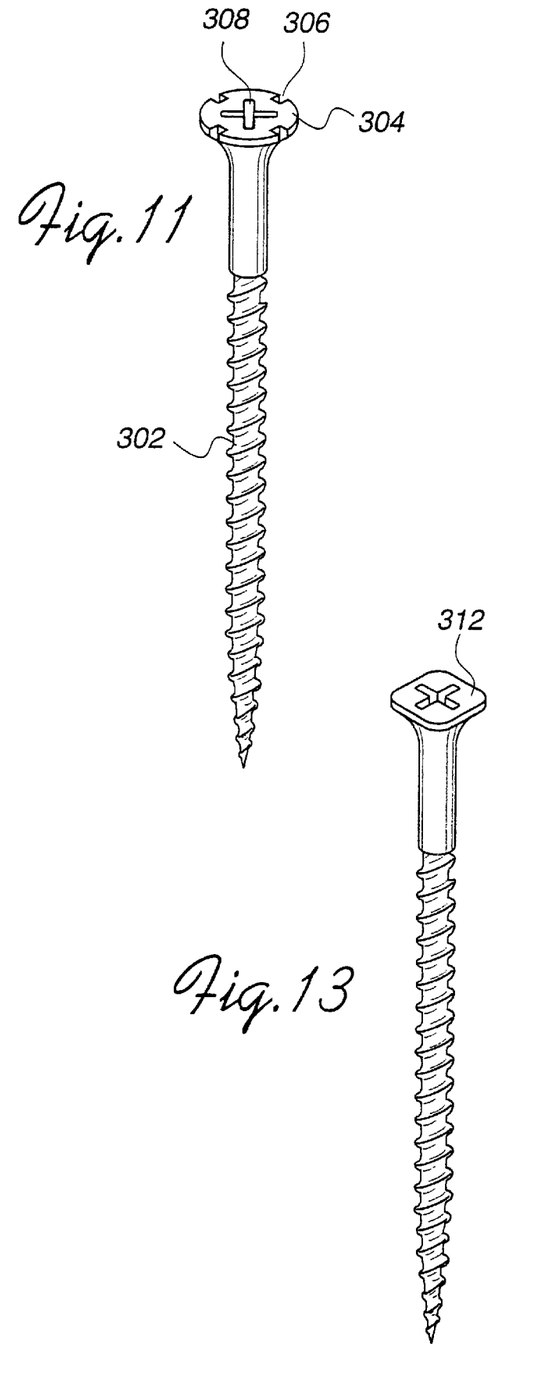
FIG. 11 illustrates a perspective view of a screw having indents formed on the screw head.
FIG. 13 illustrates a screw having a square head.
Figure 12:
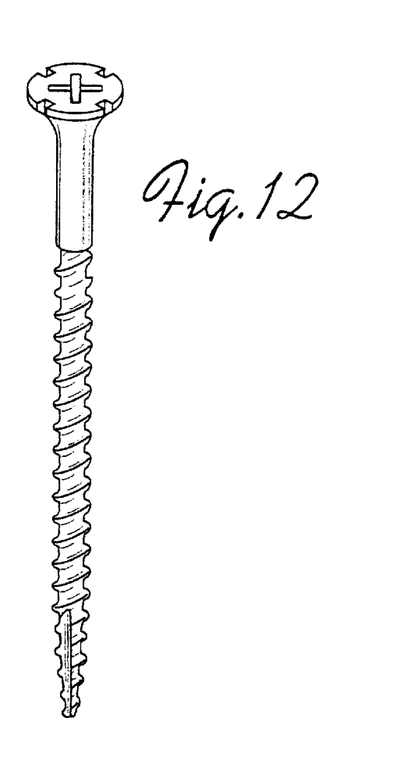
FIG. 12 illustrates a perspective view of another screw having a differently configured bit receptacle.

FIGS. 11–13 illustrate various types of screws for use with the present invention. The screw 30 includes a shank 302 and a head 304. The head 304 of the screw 30 preferably has four indents 306, each pair formed opposite side of each other. Preferably, the indents 306 are equally spaced and situated in, for example, every 90 degrees. Alternatively, two oppositely disposed indents are also suitable. In the substantially center of the head 304, there is a receptacle 308 for receiving the screwdriver bit. In FIG. 11, the receptacle 308 is configured for a Phillips screwdriver bit. FIG. 12 illustrates a screw having a differently configured receptacle for use with a flat screwdriver bit. FIG. 13 has a substantially square head 312 which can be used with the present invention having a square aperture formed in the front opening of the main sleeve. The main sleeve having a square aperture 53 is illustrated in FIG. 4.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A screwdriver and screw system comprising:
   a screwdriver including
      a shaft having a bit on one end for engaging a bit receptacle formed on a head of a screw;
      a screw engaging device coupled to and in surrounding relation to the shaft, the screw engaging device defining a cylindrical void for receiving the shaft, wherein the cylindrical void has a diameter sufficiently large to receive a head of a screw onto the bit, an inner wall of the screw engaging device defining the cylindrical void having at least one tab extending toward the center of the cylindrical void for engaging the head of the screw; and
   a screw for use with the screwdriver, the screw including
      a shank having a body portion with a tapered conical section;
      a head coupled to the shank; and
      a bit receptacle formed in a substantially center of the head, wherein around the circumference of the head, there is at least one indent configured to be engaged by the at least one tab of the screwdriver.

2. A screwdriver comprising:
   a shaft having a bit on one end for engaging a bit receptacle formed on a head of a screw, the shaft comprising oppositely facing receptacles formed on an outer circumference of the shaft;
   a pair of brackets, each bracket being disposed in a respective receptacle of the shaft;
   a screw engaging device coupled to and in surrounding relation to the shaft, the screw engaging device defining a cylindrical void for receiving the shaft, wherein the cylindrical void has a diameter sufficiently large to receive a head of a screw onto the bit, an inner wall of the screw engaging device defining the cylindrical void having at least one tab extending toward the center of the cylindrical void for engaging the head of the screw, wherein the screw engaging device includes
      a first sleeve defining a portion of the cylindrical void, the first sleeve having oppositely disposed slots; and
      a second sleeve coupled to the first sleeve to form a portion of the cylindrical void for receiving the shaft therethrough.

3. A screwdriver of claim 2, further comprising a cylindrical brace having a slit along the length of the cylindrical brace, the cylindrical brace being disposed on the first sleeve to adjustably hold the brackets in the slots.

4. A screwdriver of claim 3, wherein there are four tabs disposed evenly space on the inner wall of the screw engaging device.

5. A screwdriver of claim 2, wherein there are four tabs disposed evenly space on the inner wall of the screw engaging device.

6. A screwdriver of claim 2, further comprising a ring magnet disposed on and in surrounding relation to the bit for holding the screw.

7. A screwdriver of claim 2, wherein a rear end of the first sleeve has an outer threaded portion for rotatably mounting the second sleeve which has a matching inner threaded portion.

8. A screwdriver of claim 2, wherein each one of the brackets has a substantial an L-shape with a first portion of the bracket abutting against the receptacle of the shaft and a second portion of the bracket disposed in the oppositely disposed slots of the first sleeve.

9. A screwdriver of claim 2, wherein the bit placed on the shaft is detachable for replacing with differently shaped bits.

10. A screwdriver comprising:
   a shaft having a bit on one end for engaging a bit receptacle formed on a head of a screw, the shaft comprising oppositely facing receptacles formed on an outer circumference of the shaft;
   a pair of brackets, each bracket being disposed in a respective receptacles;
   a screw engaging device coupled to and in surrounding relation to the shaft, the screw engaging device defining a cylindrical void for receiving the shaft, wherein the cylindrical void has a diameter sufficiently large to receive a head of a screw onto the bit, an inner wall of the screw engaging device defining the cylindrical void having at least one tab extending toward the center of the cylindrical void for engaging the head of the screw.

11. A screwdriver of claim 10, wherein the screw engaging device includes:
   a first sleeve defining a portion of the cylindrical void, the first sleeve having oppositely disposed slots; and
   a second sleeve coupled to the first sleeve to form a portion of the cylindrical void for receiving the shaft therethrough.

12. A screwdriver of claim 11, wherein each one of the brackets has a substantial an L-shape with a first portion of the bracket abutting against the receptacle of the shaft and a second portion of the bracket disposed in the oppositely disposed slots of the first sleeve.

13. A screwdriver of claim 10, further comprising a cylindrical brace having a slit along the length of the cylindrical brace, the cylindrical brace being disposed on the first sleeve to adjustably hold the brackets in the slots.

14. A screwdriver of claim 13, wherein there are four tabs disposed evenly space on the inner wall of the screw engaging device.

15. A screwdriver of claim 10, wherein there are four tabs disposed evenly space on the inner wall of the screw engaging device.

16. A screwdriver of claim 10, further comprising a ring magnet disposed on and in surrounding relation to the bit for holding the screw.

17. A screwdriver of claim 10, wherein a rear end of the first sleeve has an outer threaded portion for rotatably mounting the second sleeve which has a matching inner threaded portion.

18. A screwdriver of claim 10, wherein the bit placed on the shaft is detachable for replacing with differently shaped bits.

* * * * *